United States Patent [19]

Taylor

[11] 4,013,566
[45] Mar. 22, 1977

[54] FLEXIBLE DESICCANT BODY

[75] Inventor: R. Daniel Taylor, North Ridgeville, Ohio

[73] Assignee: Adsorbex, Incorporated, North Ridgeville, Ohio

[22] Filed: Apr. 7, 1975

[21] Appl. No.: 565,544

[52] U.S. Cl. .............................. 210/502; 55/387; 55/524; 210/510
[51] Int. Cl.² ........................................ B01D 27/04
[58] Field of Search ............ 55/316, 318, 387, 389, 55/524; 210/282, 502, 510

[56] References Cited

UNITED STATES PATENTS

| 3,091,550 | 5/1963 | Doying | 55/387 X |
| 3,375,933 | 4/1968 | Rodman | 210/502 |
| 3,454,502 | 7/1969 | Hiltgen et al. | 210/502 X |
| 3,519,708 | 7/1970 | McMichael | 55/524 X |
| 3,538,020 | 11/1970 | Heskett et al. | 210/502 X |
| 3,704,806 | 12/1972 | Plachenov et al. | 55/387 X |
| 3,721,072 | 3/1973 | Clapham | 55/524 X |

*Primary Examiner*—Frank A. Spear, Jr.
*Assistant Examiner*—Robert H. Spitzer
*Attorney, Agent, or Firm*—Wood, Herron & Evans

[57] ABSTRACT

A flexible solid desiccant body is disclosed comprising finely divided particles of desiccant material, such as molecular sieve, homogeneously distributed and bound in a moisture transmissive aliphatic epoxy polymer matrix. The desiccant bodies are especially adapted for use as drier materials in refrigerant fluid systems. The flexible bodies are shaped in various sheet, tubular, rod and other forms and can be placed at various locations in refrigerant fluid systems.

21 Claims, 2 Drawing Figures

FLEXIBLE DESICCANT BODY

BACKGROUND OF THE INVENTION

Desiccants have been used in refrigeration systems for drying, and maintaining dry, refrigerant liquids, such as fluorochlorohydrocarbons. Dry fluid in refrigerant systems is essential because humidity causes serious difficulties such as ice formation or hydrolysis or refrigerant fluids to corrosive acids. The conditions of use vary somewhat from one type of refrigerant system to another. For example, in automotive refrigeration systems, the desiccant is subject to a much higher vibration and attrition than that normally found in non-automotive refrigeration systems. To combat attrition problems in automotive refrigeration, it has been proposed to protect the desiccant in several ways. One known method is to encase desiccant beads or granules in wool or polypropylene felt bags. These bags must be heat sealed or end-sewn to reduce desiccant loss, abrasion and/or dust in the cooling liquid. Further attrition problems are encountered by loosened bag fibers due to cooling liquid flow and vibration. In the case of polypropylene, there is a potential attrition problem and loss of drying efficiency due to melting or thermoplasticity of the polypropylene bags in use. Other attempts have been made to sandwich the desiccant material between fiberglass pads and metal screens. Such assemblies are cumbersome and costly, and difficulties are still encountered by attrition and escape of desiccant.

It has also been proposed to employ drying agents together with binding agents. Bonded blocks of desiccant with aluminum phosphate are suggested in U.S. Pat. No. 2,583,812; organic binders such as phenol-formaldehyde, melamine-formaldehyde, polyvinyl acetate, polyethylene, polyvinyl chloride, polystyrene, methyl cellulose, polyvinylbutyral, epoxide resin formed from epichlorohydrin and Bisphenol-A, i.e., 2,2 bis (4 hydroxyphenyl) propane, and polyurethanes are suggested in U.S. Pat. Nos. 3,025,233; 3,091,550; 3,375,933; 3,687,297; Re. 25,400; 3,545,622 and 3,538,020. These desiccant bodies suffer from one or more disadvantages, for example, rigidity which causes cracking and attrition, insufficient water sorption capacity, swelling or solution in the refrigerant, lack of sufficient permeability for the liquid refrigerant and water molecules, chemical instability, lack of heat resistivity, sensitivity to vibration and shock, and heterogeneity of desiccant particles in the binder matrix, among other disadvantages.

SUMMARY OF THE INVENTION

This invention is directed to flexible desiccant bodies and, in particular, shaped bodies adapted for use in refrigerant systems. The flexible desiccant body of this invention overcomes the multi-faceted problems and disadvantages associated with known desiccant bodies developed in the background of this invention. In accordance with this invention, a flexible solid desiccant body comprises finely divided particles of desiccant homogeneously distributed and bound in a moisture transmissive polymer matrix of a cured thermoset aliphatic epoxy resin. Moisture sorbtive resin matrices are also provided by this invention. In a presently most preferred form, the resin is a copolymeric resin of a lower alkylene oxide, for example, a copolymer of epichlorohydrin and ethylene-oxide. The desiccant is preferably a molecular sieve material such as synthetic zeolite characterized by pores of molecular dimensions and uniform size and having an ability to adsorb small moisture molecules.

It has been found that desiccant particles can be homogeneously distributed and bound in a particular moisture sorptive polymer matrix and a number of advantages are secured thereby. The homogeneous body of desiccant material is flexible, that is to say, it has properties of elasticity or compressibility or flexibility which help to dissipate the energy and forces produced during the states of vibration and mechanical shock. This flexible homogeneous body removes the hazard of the desiccant and desiccant binder from breaking and releasing small particles from the body. Flexibility is achieved by an elastomeric polymer matrix of a cured aliphatic epoxy resin. In one preferred form, the matrix further includes a flexibilizing modifier. The matrix of the desiccant body is a cured thermoset polymer which provides chemical stability in order to avoid attack by fluids to which it is exposed in the refrigerant system, such as halogenated hydrocarbons and refrigeration oil at both high and low temperatures. Another important aspect of the particular polymer matrix is its moisture transmissive nature, that is to say, its ability to transmit moisture or moisture vapor such that the desiccant material which is homogeneously bound in the matrix may receive and trap moisture in the internal matrices of the solid body. In another of its aspects, the preferred polymer matrix has the capability of sorbing moisture. Thus, both the matrix and desiccant function in this preferred form of the invention to sorb moisture. The desiccant body of this invention maintains its properties of flexibility, resistance to swelling and attack by refrigerant fluids and oils even upon exposure to extremely low temperatures and high temperatures.

This invention provides a method for mixing a powdered molecular sieve material in a moldable polymeric mass such that a homogeneous mixture can be prepared and extruded or molded continuously into various shapes or forms and to permit such molded forms to be used as solid desiccant bodies having rates of adsorption or absorption comparable to such desiccant materials alone. The molded forms of this invention have been found suitable for use as desiccant bodies to dry refrigerant fluids employed in refrigeration systems, particularly automotive systems. Furthermore, by reason of the flexibility of the polymer-molecular sieve product in accordance with the principles of this invention, it is capable of dissipating and withstanding energy imparted thereto and avoiding attrition otherwise associated with known automotive desiccant products used for similar purposes. In another of its advantageous aspects, the desiccant bodies of this invention are shaped in tubular, rod-like, sheetlike flexible or unique forms which enable them to be used in the lines of refrigerant fluids as conduits therefor and, by reason of such various shapes, the bodies may be universally adapted as driers in a multitude of end-uses. For example, physical location of the desiccant employing the body of this invention is not a limitation, in accordance with the principles of this invention, as it is with presently used desiccants and methods in the automotive refrigerator systems or commercial household refrigerators. The desiccant body can form a tubular conduit for conveying refrigerant fluids, for example. Also, it can be used as a liner for a refrigerant hose. A filter for desiccant particles is no longer necessary in automotive refrigerant systems including my desiccant bodies because desiccant particles do not come loose during use. Also, in another embodiment of this invention, an open cell structure is provided to serve as a filter damping agent and desiccant.

A particularly unique desiccant body is provided by this invention which is shaped in tubular or conduit form having exposed vanes or protrusions, external or internal. One such body has radially extending internal vanes and a core interconnecting the vanes. In cross-section, this body looks like a "wagon-wheel". This unique body has been found advantageous for use in refrigerant systems and provides fluid damping, high surface area to weight ratio and refrigerant fluid-desiccant body contact without impeding fluid flow, among its other attributes.

In the polymer-desiccant body, a sufficient amount of the particulate desiccant material is needed in the polymer matrix in order for it to perform its drying function. Generally, desiccant particles are contained in an amount of about 10–90% by weight of total desiccant-polymer weight. At increased desiccant levels within this range it has been found that a flexibilizing modifier may be needed to maintain flexibility of the polymer matrix. Such flexibilizing modifier may be internal, i.e., a part of polymer chains or external, i.e., by the addition of external plasticizers. In one form, it has been unexpectedly found that an external plasticizer can be used in the polymer matrix without loss in matrix strength or flexibility during usage. In the preferred copolymeric resins of ethylene oxide of this invention, molecular sieve material is contained in the matrix in an amount from about 40% by weight to about 80% by weight and an external flexibilizing modifier, e.g., dioctylphthalate, is contained in a flexibilizing amount.

As mentioned, the moisture sorptive polymer matrix is a cured thermoset aliphatic epoxy resin. Such thermoset resins provide flexible or elastomeric properties to the matrix. In particular, copolymeric resins of lower alkylene oxides have been found sufficiently moisture sorptive, moisture transmissive and to provide excellent physical and chemical properties as a drier matrix, particularly for refrigerant fluids. The alkylene oxide precurser in the polymer provides moisture sorptivity while the other comonomer or comonomer precursor has relatively less sorptivity for moisture such that the cured polymer matrix provides controlled moisture sorptivity with desired chemical and physical properties. A copolymer of epichlorohydrin and ethylene oxide in a 70:30 weight ratio has been found satisfactory. However, it is to be understood that other aliphatic copolymers where the lower alkylene oxide is propylene oxide for example, and the other aliphatic comonomer is other than epichlorohydrin, can be used in varying ratios to achieve the results of this invention. Exemplary of monomers which may be polymerized to form an aliphatic epoxy polymer matrix include epoxides, the alkylene oxides such as ethylene oxide, propylene oxide, butene oxides, isobutylene epoxide, substituted alkylene oxides such as epichlorohydrin, epibromohydrin, methallyl chloride epoxide, trifluoromethyl ethylene oxide, perfluoropropylene oxide, perfluoroethylene oxide, vinyl chloride epoxide, dichloroisobutylene epoxides, 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane, 1,1,1-trichloro-3,4-epoxybutane, etc., cycloaliphatic epoxides such as cyclohexene oxides, vinyl cyclohexene oxides (mono- and dioxides), α-pinene epoxide, dipentene epoxide, etc., epoxy ethers such as alkyl glycidyl ethers as, for example, methyl glycidyl ether, ethyl glycidyl ether, isopropyl glycidyl ether, isobutyl glycidyl ether, tertbutyl glycidyl ether, n-hexyl glycidyl ether, n-octyl glycidyl ether, etc., unsaturated glycidyl ethers such as vinyl glycidyl ether, allyl glycidyl ether, etc., glycidyl esters such as glycidyl acetate, glycidyl propionate, glycidyl pivalate, glycidyl methacrylate, glycidyl acrylate, etc., alkyl glycidates such as methyl glycidate, ethyl glycidate, etc. Alkylene oxides and the monosubstituted derivatives thereof such as ethylene oxide, propylene oxide, epichlorohydrin, are most preferred to provide the physical and chemical characteristics required by the product of this invention as developed above. Such aliphatic copolymers of alkylene oxides and other aliphatic comonomers are described in U.S. Pat. Nos. 3,135,705; 3,218,269; 3,158,591; 3,186,958 and 3,239,486. The disclosures of these patents relating to copolymeric epoxy resins of alkylene oxides and other comonomeric aliphatic moieties, and their methods of preparation are incorporated herein by reference, it being understood that other aliphatic copolymers can be used in accordance with this invention. The aliphatic copolymers such as epichlorohydrin and ethylene oxide copolymers as described above may be cured with known curing agents, additives, accelerators, flexibilizers and antioxidants to provide flexible or elastomeric matrices as disclosed in the above patents, and such variations are not limitations upon the scope of this invention. Aromatic copolymers of epichlorohydrin-bis phenol A have not been found suited for purposes of this invention due to their extremely slow vapor transmission rates, lack of desired sorbtivity and rigid or brittle nature, among other deficiencies.

Desiccant materials suitable for use include particulate molecular sieves, activated alumina, silica gel, etc., as disclosed in the above prior art patents. Molecular sieve materials including zeolites, natural or synthetic, have been found to be presently preferred. Suitable molecular sieve materials are disclosed in U.S. Pat. Nos. 2,882,244, 2,844,243 and 3,130,007. These zeolite molecular sieves are described in several publications; for example, Breck et al., *J. Am. Chem. Soc.*, 78, 2338 (1956), Breck et al., *J. Am. Chem. Soc.*, 78, 5963 (1956), and Reed et al., *J. Am. Chem. Soc.*, 78, 5972 (1956).

This invention and its operating parameters will be further understood with reference to the drawing and following specific examples which are presently preferred modes of practicing this invention.

Figure 1:
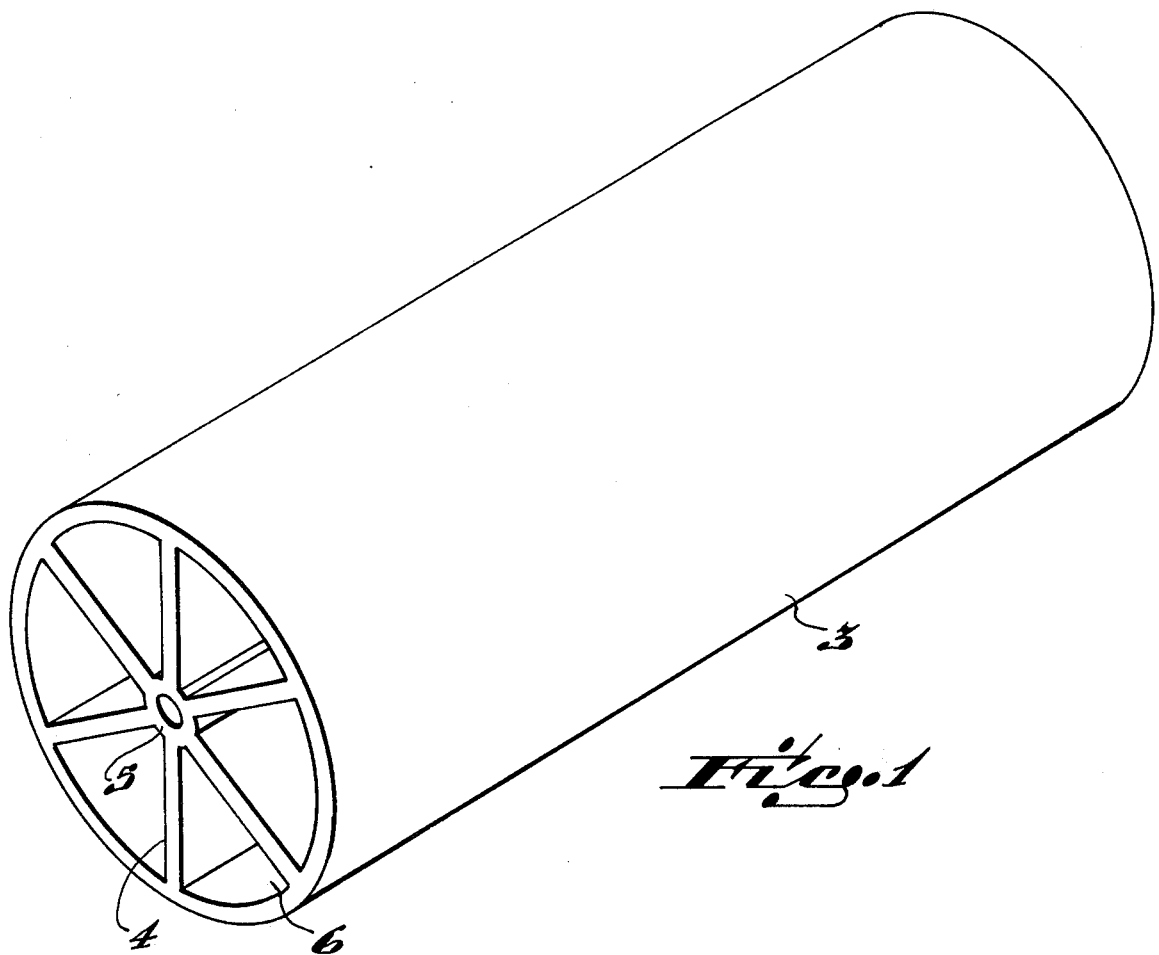
FIG. 1 is a perspective view of a tubular flexible body of this invention.
Figure 2:
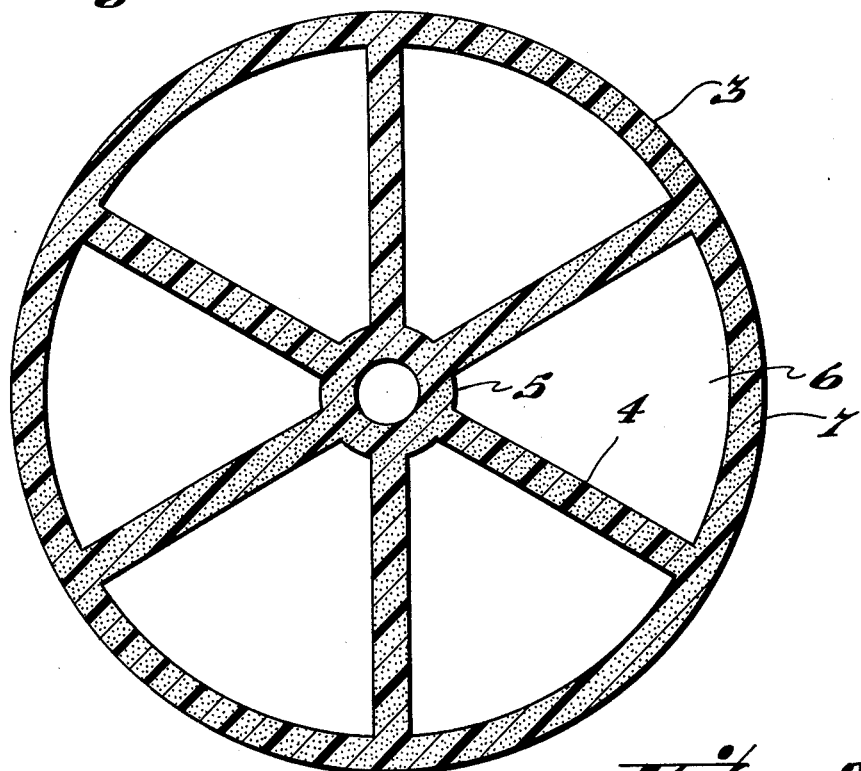
FIG. 2 is a cross-sectional view of FIG. 1.

Referring to the drawing, an extruded tubular flexible desiccant body 3 is illustrated having internal vanes 4 and core 5. The vanes 4 extend radially in cross-section of the body and are reinforced by the integral core 5 which is formed along the axis of the body. The finely divided desiccant particles 7, e.g., 1–10 microns, are homogeneously dispersed and bound in the polymer matrix and are exaggerated in the drawing. The desiccant body can be shaped to fit into a dehydrator cannister, for example, of a refrigeration apparatus where refrigerant fluid enters the tubular body at one end, passes through the channels 6 formed by the internal vanes, and leaves the body at its opposite end in a dry state.

EXAMPLE I

Zeolite (Linde Air Products Type 4A) in the amount of 195 grams (1–10 microns particle size) is mixed with 100 grams of epichlorohydrin-ethylene oxide copolymer (70:30 weight ratio). After the ingredients are mixed for about 3 minutes on a standard laboratory Banbury type mixer, 20 parts dioctylphthalate plasticizer are added along with other additives. Other additives include 5 grams dibasic lead phosphite as an antioxidant or stabilizer, 1 gram zinc stearate (lubricant), 1 gram of wax (extrusion aid), 2 grams of 2-mercapto imidazoline curing catalyst containing 25% inert carrier and 5 grams carbon black filler. After mixing for another 5 minutes, the compound is then put on a two roll mill where 1.5 grams of ethylene thiourea (curing agent) is added. Temperature during the Banbury mixing is held at about 300° F. The mixture is then extruded into an elongated "wagon-wheel" shape, as shown in the drawing, and cured in a hot air oven at 320° F for 30 minutes. The specific gravity of the resulting homogeneous body is about 1.4 g./cc. The wagon-wheel shaped body provides a surface to weight ratio which has been found advantageous for moisture sorptivity without restricting fluid flow in refrigerating systems.

EXAMPLE II

The mixing temperature in the Banbury of Example I was held to 200° F while everything else remained the same as in Example I. The resulting product specific gravity is about 1.0 g./cc. This phenomenon is due to the zeolite which acts as a blowing agent and the blowing efficiency is reduced as the mixing temperature is raised.

EXAMPLE III

Zeolite 4-A in the amount of 300 grams (1–5 microns particle size) is mixed with 100 grams of copolymer as in Example I. After mixing for 3 minutes, on a standard laboratory Banbury type mixer, the plasticizer is added along with the other additives as in Example I. The plasticizer used is dioctylphthalate in the amount of 30 grams. The remainder of the process is the same as in Example I.

EXAMPLE IV

Example I is followed except that the homogeneous mixture is not extruded, but is molded in a 3 ton press at 320° F for 30 minutes. The resulting compound had a specific gravity of 1.6 g./cc.

In an alternate embodiment of the invention, the copolymer with zeolite is employed to make an open-cell foam structure. This homogeneous mixture in the open-cell foam form can be used as a combined filter, a desiccant, and a damping agent in refrigeration systems. The dominant property of the foam structure is its permeability to fluids. An example of a method of manufacture is shown below in Example V.

EXAMPLE V

Zeolite (Type 4A) in the amount of 195 grams (1–5 microns particle size) is mixed with 100 grams of copolymer as in Example 1. Blowing agents such as halogenated hydrocarbon liquids are added in an amount of about 18 grams. These ingredients are mixed in a Banbury along with 40 grams dioctylphthalate for about 7 minutes and then placed on a two roll mill where the cure system is added. The cure system includes 5 grams of dibasic lead phosphite, 7 grams of dibasic lead phthalate, 1 gram of carbon black and 2 grams of hexamethylenediamine carbamate. Samples should be compression molded for about 9 minutes at 347° F. While under pressure the mold should be allowed to cool at 220° F and then opened. The products are then post cured for 30 minutes at 325° F to produce the finished product. Other polymer-desiccant combinations can be used as above and the examples should not be limiting factors on this invention. Also, other blowing agents and cure methods may be used.

The flexible molded desiccant polymer-molecular sieve compositions of the foregoing examples have been found to be very suitable as drier materials for air conditioning systems. For example, a molded body of the type produced in Example I, when compared with granular molecular sieve materials and activated alumina, alone, possesses a very favorable moisture sorptive capacity. The moisture sorbing capacity for an Example I type body is about 11% by weight as compared to about 16% by weight for molecular sieve material alone and about 11% by weight for activated alumina alone. However, the problems associated with the use of such granular desiccant materials, as detailed in the background of this invention, are eliminated by the molded molecular sieve-polymer desiccants of this invention. Also, loss of desiccant materials during production is negligible compared to assembly of prior art bags and beads, etc. In addition, a refrigerant filter for desiccant particles is no longer necessary for use with the desiccant body of this invention because particles do not come loose as with prior assemblies of molecular sieve and activated alumina beads or powders. The molded bodies of this invention are easy to handle and to assemble in a refrigerant system. Furthermore, because of the homogeneous nature of the molded composition, it can be molded or extruded into almost any shape and the physical location of the desiccant in the refrigerant system according to this invention is not limited as it is with presently used molecular sieve beads or powders in automotive refrigeration systems. Furthermore, unlike activated alumina or molecular sieve powder and beads heretofore employed as desiccant materials in refrigeration systems, extra parts such as baffles, pads, bags, screens or the like can be eliminated.

It has been surprisingly found that 15 cubic inches of activated alumina or 4 cubic inches of molecular sieve material are equivalent in water sorbing capacity to 3 cubic inches of polymer-molecular sieve material of this invention having a bulk density of 1.28 g./cc. Therefore, even though the molecular sieve material is embodied in the polymer matrix, the sorbing capacity of the thus formed body is greater than a greater volume of molecular sieve or activated alumina alone. This exhibits the unexpected dual sorptive capacity of the desiccant bodies of this invention. Furthermore, when the molecular sieve-polymer body of this invention is aged at 180° F for 72 hours with Freon 12 and refrigeration oil, there is no noticeable volume change, and the hardness, elongation and tensile strengths of the body remain virtually the same as the original material before test. Also, when the molecular sieve-polymer body is aged at −40° F for 72 hours in Freon 12 and refrigeration oil, tensile strength, elongation, hardness and volume change are virtually negligible as compared with the originally molded material. The molded body at −40° F is still flexible and a visual inspection after test indicates that the polymer-molecular sieve body does not show any deterioration of the material. All of these results indicate that the desiccant material of this invention is exceedingly useful as drier material for air conditioning systems and that, unlike activated alumina or molecular sieve beads and powder which required protection in order to avoid deterioration due to vibration shock in such refrigeration systems, the desiccant material of this invention does not deteriorate because of its flexibility thus provides excellent handling and installation properties in comparison to previously used beads and powder. Also, the molded molecular sieve-polymer bodies of this invention may be regenerated for continued use.

All of the above data demonstrates that the desiccant bodies of this invention provide advantages in commercial and automotive air conditioning refrigerant systems. The desiccant bodies also have several advantages over present methods of desiccation, including no attrition problems which could otherwise cause the failure of many refrigeration systems. Further, high cost internals such as wool or polypropylene filled bags, fiberglass pads or the like which have been used to protect the desiccant powder or beads in the past are not required; and due to variability of shape, the desiccant material is virtually unlimited in where it can be placed in the refrigerant system. Inventive desiccant bodies of the type exemplified exhibit little or no swell under test, for example, −1.28 linear swell in 4 days at 70° F in Freon 12 at −0.60% linear swell in 4 days at 250° F and a volume change at 257° F in compressor oil (ASTM Oil No. 1) at the end of 3 days is 0.2% and at the end of 28 days is 0.2%. Therefore, the desiccant body is compatible with refrigerant fluids and has oil resistance which makes it extremely adaptable for its intended use in refrigerant systems. The sorption rate of desiccant bodies can also be designed to fit the particular needs of end-use by varying their surface areas upon extrusion or molding.

Other embodiments of this invention will become apparent in view of the above description without departing from the spirit and scope thereof.

What is claimed is:

1. A flexible solid desiccant body comprising finely divided particles of desiccant material homogeneously distributed and encapsulated in a moisture transmissive polymer solid matrix of a cured thermoset aliphatic epoxy resin.

2. The desiccant body of claim 1 wherein said matrix is moisture sorbtive.

3. The desiccant body of claim 1 wherein said resin is a copolymeric resin of a lower alkylene oxide.

4. The desiccant body of claim 1 wherein said polymer matrix includes a flexibilizing modifier.

5. The desiccant body of claim 3 wherein said resin is a copolymer of epichlorohydrin and ethylene oxide.

6. The desiccant body of claim 5 wherein said polymer contains about 70% epichlorohydrin and about 30% by weight ethylene oxide.

7. The desiccant body of claim 1 wherein said desiccant is a molecular sieve material.

8. The desiccant body of claim 7 wherein said sieve material is a synthetic zeolite.

9. The desiccant body of claim 1 wherein the desiccant is contained in an amount of about 10 to about 90% by weight based upon total desiccant-polymer matrix weight with the proviso that as the desiccant increases toward about 90% by weight then a flexibilizing modifier in an effective flexibilizing amount is included in said cured matrix.

10. A flexible solid desiccant body for drying refrigerant fluids comprising finely divided particles of molecular sieve material homogeneously distributed and encapsulated in a moisture transmissive and sorptive polymer solid matrix of a cured thermoset aliphatic epoxy resin.

11. The desiccant body of claim 10 wherein said resin is a copolymeric resin of lower alkylene oxide.

12. The desiccant body of claim 10 wherein said resin is a copolymer of epichlorohydrin and ethylene oxide.

13. The desiccant body of claim 12 further containing an external flexibilizing modifier.

14. The desiccant body of claim 13 wherein said modifier is dioctylphthalate.

15. The desiccant body of claim 11 wherein the molecular sieve material is contained in an amount of from about 40% by weight to about 80% by weight of total molecular sieve material-polymer matrix weight.

16. The desiccant body of claim 15 wherein said molecular sieve comprises a synthetic zeolite.

17. The desiccant body of claim 10 shaped in tubular form.

18. The desiccant body of claim 10 shaped in sheet form.

19. The desiccant body of claim 10 shaped in tubular form having exposed vanes.

20. The desiccant body of claim 19 having internal radially extending vanes and a core interconnecting said vanes.

21. The desiccant body of claim 10 having an open-celled structure.

* * * * *